US012775924B2

(12) United States Patent
Dheeraj Raju

(10) Patent No.: US 12,775,924 B2
(45) Date of Patent: Oct. 27, 2026

(54) PREDICTIVE RESCAN SERVICE

(71) Applicant: NCR Voyix Corporation, Atlanta, GA (US)

(72) Inventor: Nannapuraju Dheeraj Raju, Hyderabad (IN)

(73) Assignee: NCR Voyix Corporation, Atlanta, GA (US)

( * ) Notice: Subject to any disclaimer, the term of this patent is extended or adjusted under 35 U.S.C. 154(b) by 0 days.

(21) Appl. No.: 18/903,561

(22) Filed: Oct. 1, 2024

(65) Prior Publication Data

US 2025/0094951 A1 Mar. 20, 2025

Related U.S. Application Data

(62) Division of application No. 17/383,576, filed on Jul. 23, 2021, now Pat. No. 12,131,305.

(51) Int. Cl.

| | |
|---|---|
| ***G06Q 20/18*** | (2012.01) |
| ***G06N 20/00*** | (2019.01) |
| ***G07G 1/00*** | (2006.01) |
| ***G07G 1/01*** | (2006.01) |
| ***G07G 3/00*** | (2006.01) |

(52) U.S. Cl.

CPC ............ *G06Q 20/18* (2013.01); *G06N 20/00* (2019.01); *G07G 1/0036* (2013.01); *G07G 1/01* (2013.01); *G07G 3/006* (2013.01)

(58) Field of Classification Search

CPC ...... G06Q 20/18; G06N 20/00; G07G 1/0036; G07G 1/01; G07G 3/006; G07G 1/0009; G07G 1/0045

See application file for complete search history.

(56) References Cited

U.S. PATENT DOCUMENTS

| | | | | |
|---|---|---|---|---|
| 2006/0043175 | A1* | 3/2006 | Fu | G06Q 20/3227 235/383 |
| 2021/0365676 | A1* | 11/2021 | Valouch | G06V 20/62 |
| 2022/0092568 | A1* | 3/2022 | Laserson | G06Q 20/4014 |
| 2022/0230173 | A1* | 7/2022 | Sumpter | G06T 7/62 |
| 2024/0311788 | A1* | 9/2024 | Mattison | G06Q 20/18 |

FOREIGN PATENT DOCUMENTS

| | | | |
|---|---|---|---|
| WO | WO-2020219487 A1 * | 10/2020 | G08B 13/2414 |

* cited by examiner

*Primary Examiner* — Garcia Ade

(74) *Attorney, Agent, or Firm* — Schwegman Lundberg & Woessner, P.A.

(57) ABSTRACT

Transaction records for self-service checkout transactions are provided in real-time to a customizable machine-learning rescan audit service. Any retailer defined settings with respect to random audits are enforced by the service and the real-time transaction records are provided to a machine-learning model that returns rescan scores based on the real-time transaction records. The service compares the rescan scores in view of retailer-defined suspicious scores for both a full rescan of a given checkout transaction and a partial rescan of the given checkout transaction. The service alerts the retailer when a rescan audit is predicted to be warranted for any given self-service checkout transaction based on random selection or based on the computed rescan score. The machine-learning model is continuously and regularly retrained. In an embodiment, the service provides reports, a dashboard, and mining of the transaction records and the audits to the retailer though a service-provided interface.

20 Claims, 3 Drawing Sheets

PREDICTIVE RESCAN SERVICE

CROSS-REFERENCE TO RELATED APPLICATION

This application is a division of U.S. patent application Ser. No. 17/383,576, filed Jul. 23, 2021, which application and publication is incorporated herein by reference in its entirety.

BACKGROUND

Self-Service checkouts and self-shopping have become prominent through the industry. As technology has advanced, both consumers and retailers have deployed solutions that allow the consumers to more efficiently shop and that allow the retailers to substantially reduce overhead.

Nearly every retailer provides Self-Service Terminals (SSTs) that allow consumers to scan and pay for their items without having to interact with retailer staff. Many retailers, in recent years, have also provided mobile applications or specialized portable devices to consumers that allow the consumers to scan items as they shop without having to scan the items at an SST.

A major concern of retailers with this technology is theft or fraud committed by the consumer. For example, a consumer may pretend to scan an item when in fact the barcode for the item is never actually detected and read by a camera of the mobile shopping device or by a scanner of the SST (known as scan avoidance theft). In another situation, the consumer may replace a lower priced item's barcode on a higher priced item that the consumer scans (known as barcode swapping theft).

A variety of security techniques and technologies have been deployed by retailers to detect theft, such as video analysis to analyze images of the customer while shopping, bag weigh scales to analyze item weights of items scanned by the customer, sensors to detect smart tags that were not deactivated properly when scanned, etc.

The problem with existing security techniques is that when the retailer detains a consumer to check and rescan their items before the consumer exits the store and there was no theft, the consumer is upset and believes he/she was unfairly targeted. This also often results in the consumer posting to social media about their negative experience.

Another problem with existing security techniques is that if the sensitivity is biased towards erroring on the side of catching more fraud, then the number of false positives are increased. This can increase the number of innocent consumers detained for audits and increase the negative opinion that the retailer has with its customers. Additionally, this approach can require more audit staff and cause customer queues to develop during checkouts, which defeats the very purpose of the self-checkout technology to provide efficient shopping for the retailer's customers and to reduce checkout staff of the retailer. However, if the existing security techniques are biased towards assuming a transaction is legitimate and not associated with any fraud, then the retailer may experience theft levels that outweigh the benefits of the self-checkout technology.

As a result, retailers are struggling with the proper mix of security audits, which maximize catching theft but minimize auditing legitimate transactions not associated with any theft.

SUMMARY

In various embodiments, methods and a system for a predictive rescan service during consumer self-checkouts with a retailer.

According to an embodiment, a method for providing and processing a predictive rescan service is presented. As an example, a transaction record is received for a self-service checkout transaction. A determination is made as to whether to subject the self-service checkout transaction to a random rescan audit based on a first setting. A rescan store is calculated for the self-service checkout transaction using the transaction record. A determination is further made as to whether to subject the self-service checkout transaction to a predicted rescan audit based on the rescan score and a second setting. Finally, a determination is made as to whether to send a rescan audit message to a transaction manager associated with a store where the self-service checkout transaction is being processed based on the determining for the first setting or based on the determining for the second setting.

DETAILED DESCRIPTION

Figure 1:
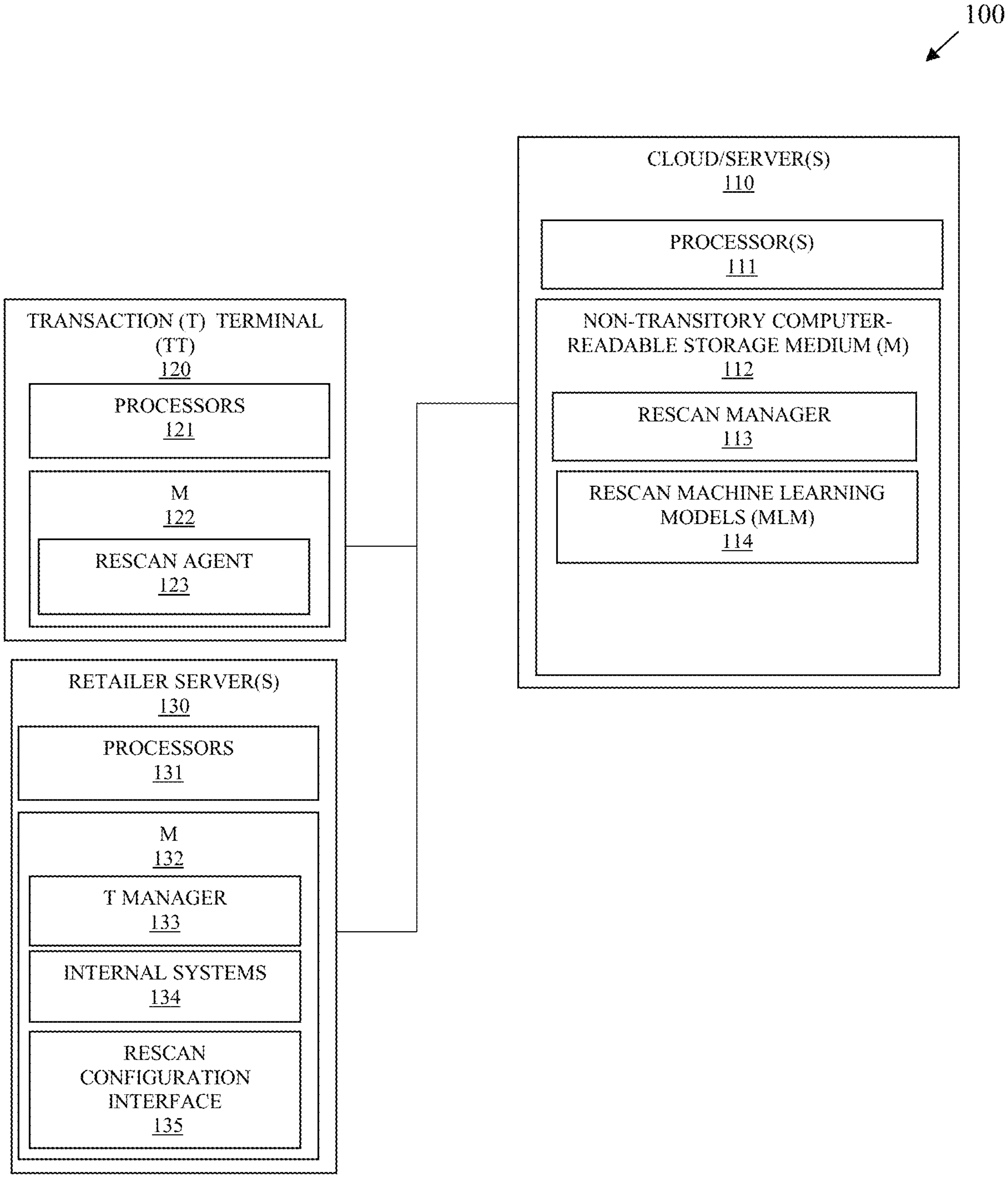
FIG. 1 is a diagram of a system for providing and processing a predictive rescan service, according to an example embodiment.

FIG. 1 is a diagram of a system/platform 100 for providing and processing a predictive rescan service during consumer self-checkouts, according to an example embodiment. It is to be noted that the components are shown schematically in greatly simplified form, with only those components relevant to understanding of the embodiments being illustrated.

Furthermore, the various components (that are identified in system/platform 100) are illustrated and the arrangement of the components are presented for purposes of illustration only. It is to be noted that other arrangements with more or less components are possible without departing from the teachings of providing, processing, and operating a predictive rescan service for determining when to audit a self-checkout of a consumer from a given retail store, presented herein and below.

System/platform 100 (herein after just "system 100") provides a processing environment by which retailers can configure a predictive rescan service's mode of operation and receive rescan decisions for self-check outs in real time as to whether a given transaction should or should not be flagged for a rescan audit at the store. The predictive rescan service utilizes a trained machine-learning model that produces a rescan score for a given self-checkout, the score can then be compared against a retailer-defined threshold and a decision provided back to the retailer for the self-checkout as to whether the checkout should or should not be subject to a rescan audit at the store.

The trained machine-learning model can be set into a self-training mode (silent mode) or a decision mode (non-silent mode). The model utilizes transaction data (and/or other data) captured for transactions along with known fraudulent transactions to determine from rescans or other post-transaction evaluations of the retailer to train, configure, and revise the model. The retailer can restrict the predictive service to staying under or staying at a predefined number of rescans within a retailer-defined period of time.

Furthermore, the predictive service can be configured to randomly select a retailer-defined percentage or number of self-checkouts for rescan audits within a retailer-defined period of time. Furthermore, the predictive rescan service can be configured to direct any rescan decision to retailer-defined item counts or retailer-defined time frames (for example, a transaction subject to rescan may complete after 10 of 20 items in the transaction are rescanned for the audit, or the rescan may complete when an elapsed time for the rescan is reached). So, the retailer can control and set limits on any rescan audit decision.

System 100 comprises a cloud/server 110, one or more transaction terminals 120, and one or more retailer servers 130.

Cloud/Server 110 comprises at least one processor 111 and a non-transitory computer-readable storage medium 112. Medium 112 comprises executable instructions for a rescan manager 113 and one or more rescan machine-learning models (MLMs) 114. The executable instructions when provided to and executed by processor 111 from medium 112 cause processor 111 to perform the processing discussed herein and below for rescan manager 113 and model(s) 114 for purposes of providing a predictive rescan auditing service (predictive rescan service of just rescan service) to a retailer for the retailer's self-checkout transactions.

Each transaction terminal 120 comprises at least one processor 121 and a non-transitory computer-readable storage medium 122. Medium 122 comprises executable instructions for a rescan agent 123. The executable instructions when provided to and executed by processor 121 from medium 122 cause processor 121 to perform the processing discussed herein and below for rescan agent 123.

Each retailer server 130 comprises at least one processor 131 and a non-transitory computer-readable storage medium 132. Medium 132 comprises executable instructions for a transaction manager 133, a variety of internal retailer systems 134, and a rescan configuration interface 135. The executable instructions when provided to and executed by processor 131 from medium 132 cause processor 131 to perform the processing discussed herein and below for transaction manager 133, internal systems 134, and rescan configuration interface 135.

Initially, a retailer provides access to historical transaction data for self-checkout transactions and with those historical transactions that were subject to rescan audits and the historical determinations as to whether the rescan audit transactions were or were not determined to be fraudulent or not accurate. This training data or access to the data is provided by the retailer to rescan manager 113 through rescan configuration interface 135.

Manager 113 provides the historical transaction data (and potentially other external data (such as event information or weather information for each transaction on the date of the corresponding transaction)) to model 114. Manager 113 may further tag the historical data with the known fraudulent data for the corresponding transaction data known to be associated with fraudulent transactions. Model 114 configures itself to produce an algorithm that when provided historical transaction data for the historical transaction identifies the known fraudulent transactions (expected output from the algorithm) for the transaction data associated with the known fraudulent transactions and identifies the known non-fraudulent transactions from the transaction data associated with the known non-fraudulent transactions).

After the initial training on the historical transaction data, model 114 is prepared to be provided real-time transaction data for a given self-checkout transaction and produce as output a rescan score (a confidence value or percentage (0-100 or 0.1-1.0)) that indicates whether the given transaction should or should not be subject to a rescan audit at the corresponding retail store.

In an embodiment, model 114 can be a regression-based algorithm or a neural network-based algorithm.

The retailer can also further configure rescan manager 113 with a variety of options, such as a random percentage of transactions to select for a full rescan (rescan of all items of the transaction), a random percentage of transactions to select for a partial rescan (rescan of less than all items on the transaction), suspicious scores to compare with the outputted rescan scores for determining full rescans and for determining partial rescans, a non-silent mode during which rescan manager 113 uses model 114 to compare rescan scores against the corresponding suspicious scores set by the retailer, concurrent settings to enforce or evaluate rescan decisions of the store (such as an enable and disable option, a maximum number of concurrent rescans that can be simultaneously processed at the store at any given point in time (e.g., only 3 ongoing or pending rescans can be processed within the store), and maximum minutes that a given rescan can take or allowed to be processed within the store (e.g., maximum 5 minutes for a given rescan after which the rescan is terminated)), retraining schedule for model 114 (scheduled date, time of day, frequency for uploading transaction data to train model 114), and trustworthy customer identifiers or a list of customer identifiers that are believed to be trustworthy and that should not subject to rescan audits even if the rescan score when compared to the suspicious scores indicate otherwise (this may be something that the retailer wants to enforce for the high-value customers and is provided as an option for the retailer to ensure that such customers are not subject to rescan audits).

Manager 113 configures the retailer-provided options received through rescan configuration interface 135 for the retailer. It is noted that a given retailer may configure each store of the retailer with different options or may enforce one set of options across stores of a given region and/or all stores of the retailer.

The retailer can also change the non-silent mode to silent mode dynamically and in real time using rescan interface 135 to have manager 113 dynamically change the mode of operation setting for the predictive rescan service provided by system 100. During a non-silent mode of operation, rescan manager 113 receives real-time transaction data from rescan agent 123; provides the real-time transaction data for self-checkouts to model 114 as input; and receives as output rescan scores from model 114. Manager 113 compares rescan scores against the suspicious scores and when a given transaction has a rescan score that meets or exceeds the set suspicious score, manager 113 sends a message to transaction manager 133 to perform either a full rescan or partial rescan on that transaction at the corresponding store. Manager 113 also enforces any concurrent settings that were set as options by the retailer during a non-silent mode of operation. For example, no rescan message is sent when the current ongoing (concurrent) rescans at the store is at the set limit. Additionally, if max item counts or minutes to count (rescan) are set for concurrent rescans those are provided for any rescan to transaction manager 133 by rescan manager 113.

If a customer proceeds to checkout at a terminal 123, agent 123 sends transaction details to manager 113. Manager 113 checks to see if there is a random setting associated with rescan audits or not, if there is and if the transaction is randomly selected for either a full rescan or a partial rescan, manager 113 sends a message for full or partial random rescan to transaction manager 133. Transaction manager 133 then either alerts agent 123 on the terminal 120 where the customer is checking out of the rescan audit or notifies a staff member a different instance of agent 123 on a different terminal 120 that is manned by a staff member of the store that the customer transaction is to undergo a full or a partial rescan audit. The staff member then instructs the customer to processed to the staff person's terminal 120 before existing the store for the staff to perform the full or partial rescan. Results of the rescan are retained and used for subsequently training model 114. It may also be that the customer is checking out on an SST 120, such that transaction manager 133 can dispatch a staff member directly to that SST 120 and conduct the full or the partial rescan on the SST 120.

During a customer checkout for a transaction when the non-silent mode is disabled, manager 113 does not send any messages for rescans to transaction manager 133.

During a checkout when the non-silent mode is enabled, agent 123 sends the transaction details to manager 113, manager 113 decides whether the checkout should be randomly selected or not for a rescan (partial or full) if this setting is activated. Assuming the setting is activated, and the checkout transaction is not selected for random rescan or assuming the setting is not activated, the transaction details are provided as input to model 114. Model 114 returns a rescan score, which manager 113 compares against the retailer-set suspicious scores (a suspicious score for full rescan and a different suspicious score for partial rescan). Retailer-defined deviation values from the suspicious scores may also be set during configuration by the retailer during configuration through rescan configuration interface 135. Manager 113 compares the suspicious scores against the returned rescan score, optionally using any deviation values and determines whether a full or partial rescan audit is warranted for the checkout transaction. If a determination is made for a full or partial rescan, manager 113 sends a message to transaction manager 133. Transaction manager 133 then alerts staff to perform the rescan audit on the customer before the customer exits the store either at an SST 120 where the customer checked out or at a different terminal 120 situated near an egress of the store that is operated by a staff member.

Assuming a trustworthy identifier is associated with a customer identifier that is checking out of the store, and assuming the customer's transaction was selected for rescan (randomly or based on a computed rescan store provided by model 114 from the transaction details of the transaction, manager 113 does not send any message for that rescan to be performed. This is essentially an override configured by the retailer for its most-valued customers ensuring that these customers are not subject to rescans and are not detained within the store for the audits.

Rescan manager 113 may also send any active rescan current settings associated with minutes to count during a selected rescan audit transaction to transaction manager 133. Transaction manager 133 then enforces the maximum minutes allowed for the rescan against the rescan transaction being performed by staff on terminal 120. Additionally, if a rescan is selected and a maximum number of allowable concurrent rescans are currently still in progress, manager 113 does not send a message to rescan when that decision was made and when ongoing and pending rescans are at the maximum number permitted by the retailer within the store.

Every transaction record (set of transaction details for self-service transactions within the store), the corresponding set values for the retailer options/settings, terminal identifier for the terminal of the corresponding transaction, transaction graphical user interface (GUI) identifier for the transaction interface being processed during the transaction, and transaction identifier for the transaction are retained in the retailers transaction data store or reporting data store regardless as to whether the transaction is associated with an enabled silent mode or an enabled non-silent mode of operation. This ensures that the data used for retraining model 114 is robust and complete.

The retailer can also operate rescan configuration interface 135 to receive reports, statistics, or view an active dashboard for ongoing transactions, sales, cost of goods, gross profit, gross margin, average value of baskets/transactions, total rescans, fraud percentage for the total rescans, and/or current rescanning audits within the store. Manager 113 mines the transaction data store and assembles reports that have been predefined by the retailer through interface 135 or that are dynamically requested.

At retailer-defined intervals of time (can be defined by retailer through interface 135), rescan manager 113 obtains the transaction records and initiates a retraining of model 114. Manager 113 may pre-tag the transaction records to identify whether or not rescanned transactions in the transaction data were determined or were not determined to have fraud (if such information is not already available in each transaction record). Model 114 then reconfigures its machine-learning algorithm(s) to more accurately identifying fraud versus non-fraud based on the fraudulent transactions and the non-fraudulent transactions in the transaction records.

The silent mode of operation or the disabled non-silent mode of operation permits retailers to obtain an initial set of historical transaction records for initial training of model 114. Once initially trained, the retailer can enable the non-silent mode of operation. This option/setting also allows a short-staffed retailer that is experience heavy customer traffic to temporarily suspend rescan audits until sufficient staff is around to process the rescans and/or until the customer traffic volume level is manageable with existing staff.

In an embodiment, transaction terminal 120 is an SST, a specialized mobile shopping device of a retailer, a Point-Of-Sale (POS) terminal of the retailer, a management terminal of the retailer, a customer's mobile phone, a tablet, a laptop, or a wearable processing device. Again, it is noted that the self-checkout performed by a customer can be performed on a terminal 120 that is the same as or different from a terminal 120 where staff of the retailer performs a rescan audit. For example, a customer uses an SST for checkout, a rescan audit is performed on a POS terminal or management terminal of the retailer; a customer uses a mobile phone for checkout, a rescan audit is performed on a POS terminal or management terminal of the retailer; a customer uses an SST for checkout, a rescan audit is performed on the same SST by staff dispatched to the SST for the audit; etc.

One now appreciates how system 100 provides a cloud-based or remote-based management of rescan audits, which provides a variety of customized controls and reporting capabilities to the retailer and which is adaptable and dynamic. Moreover, system 100 is continually learning and becomes more accurate over time in predicting fraudulent transactions through retraining of model 114.

Figure 2:
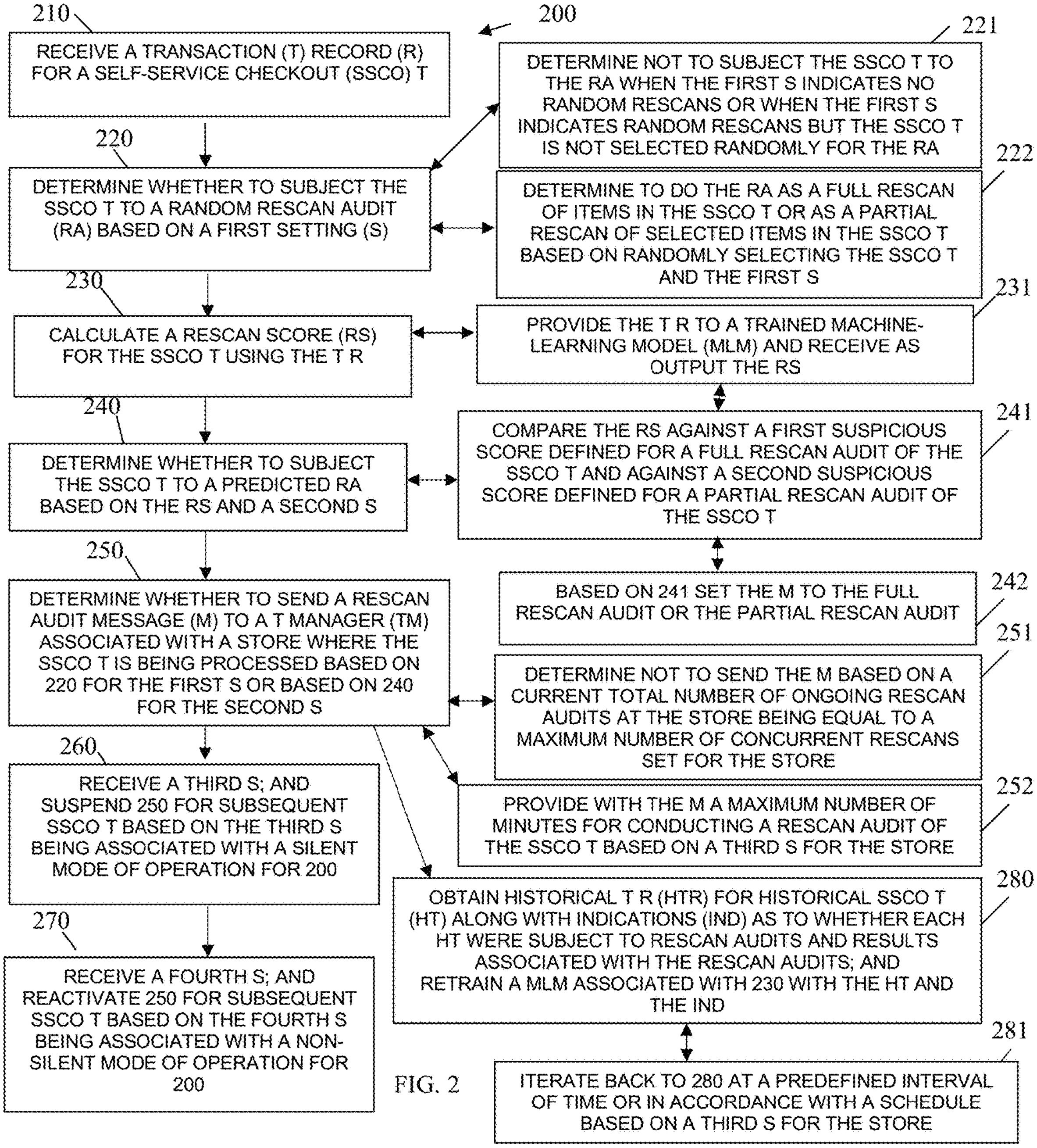
FIG. 2 is a diagram of a method for operating a predictive rescan service, according to an example embodiment.
Figure 3:
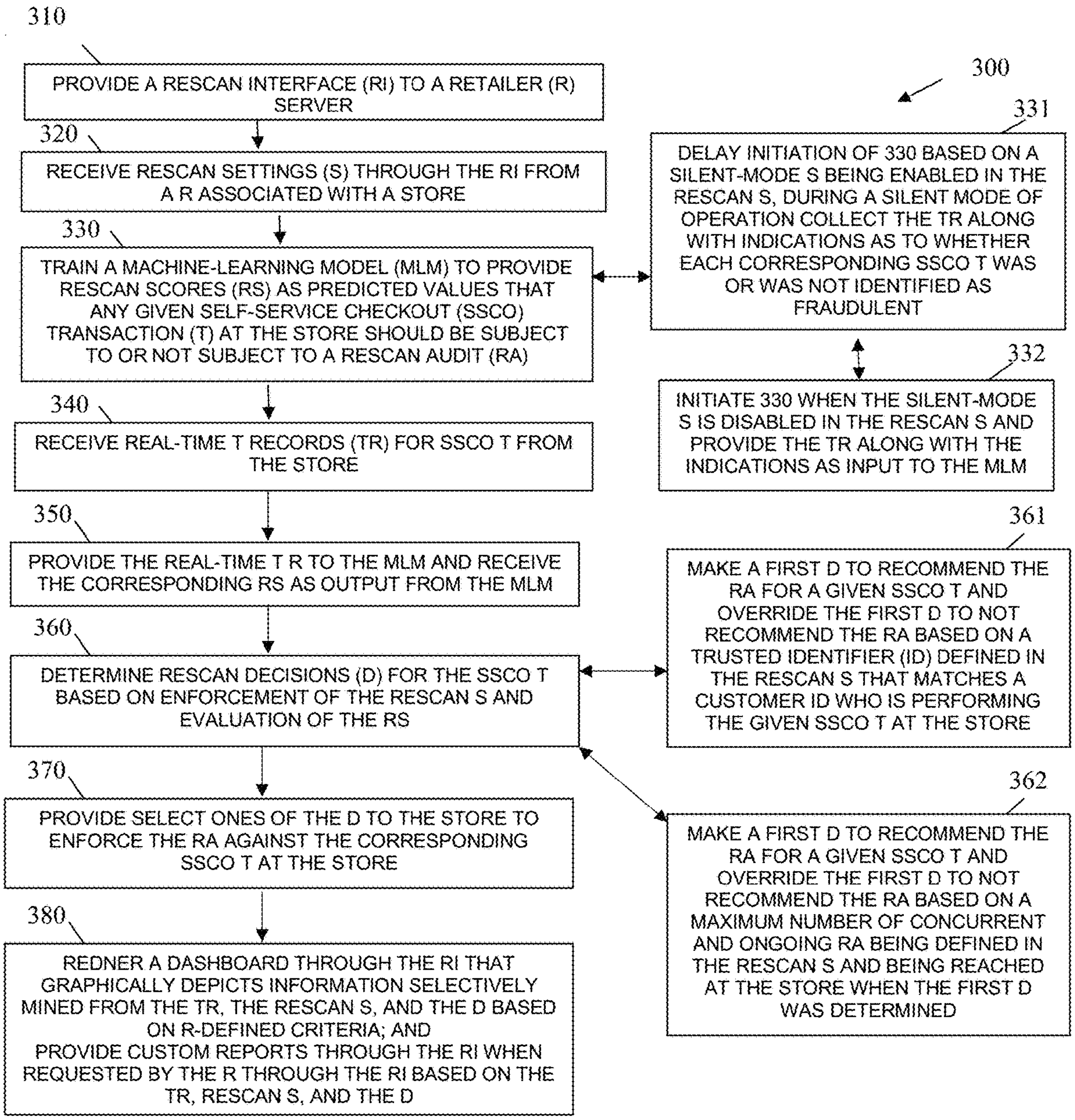
FIG. 3 is a diagram of another method for operating a predictive rescan service, according to an example embodiment.

The above-referenced embodiments and other embodiments are now discussed within FIGS. 2-3.

FIG. 2 is a diagram of a method 200 for operating a predictive rescan service for purposes of determining when to audit a consumer during a self-checkout with a retail store, according to an example embodiment. The software module(s) that implements the method 200 is referred to as a "predictive rescan manager." The predictive rescan manager is implemented as executable instructions programmed and residing within memory and/or a non-transitory computer-readable (processor-readable) storage medium and executed by one or more processors of one or more devices. The processor(s) of the device that executes the predictive rescan manager are specifically configured and programmed to process the predictive rescan manager. The predictive rescan manager may have access to one or more network connections during its processing. The network connections can be wired, wireless, or a combination of wired and wireless.

In an embodiment, the device that executes the predictive rescan manager is cloud 110. In an embodiment, cloud 110 comprises a plurality of servers logically cooperating and accessible as a single server 110 (cloud 110).

In an embodiment, the predictive rescan manager is all or some combination of 113, and/or 114.

At 210, the predictive rescan manager receives a transaction record for a self-service checkout transaction being performed by a customer at a store of a retailer. It is noted that the transaction can be processed by the customer on a customer mobile device (phone, tablet, watch) or can be processed on a retailer device (SST or mobile shopping terminal). The transaction record comprises item information for items scans by the customer, time of day, day of week, calendar date, terminal identifier (device customer operated to scan item barcodes), store identifier, retailer identifier, pricing information for the items, customer identifier for the customer (when available), and other information.

At 220, the predictive rescan manager determines whether to subject the self-service checkout transaction to a random rescan audit based on a first setting provided by the retailer for rescan audits.

In an embodiment, at 221, the predictive rescan manager determines not to subject the self-service checkout transaction to the random audit when the first setting indicates that no random rescans are to be performed or when the first setting indicates that random rescans are to be performed but the self-service checkout transaction is not selected by the predictive rescan manager for the random rescan audit.

In an embodiment, at 222, the predictive rescan manager determines to do the random rescan audit as a full rescan of all items associated with the transaction or as a partial rescan of selected items in the transaction based on randomly selecting the transaction and based on the first setting.

In an embodiment, the first setting is a percentage of the transactions that are to be selected for full rescans and another percentage of the transactions that are to be selected for partial rescans. The predictive rescan manager manages these percentages and randomly selects transactions for either the full rescan or the partial rescan. It is to be noted that this can be disabled as well such that while disabled no transactions are selected for random rescans.

At 230, the predictive rescan manager calculates a rescan store for the self-service checkout transaction using the transaction record for the transaction.

In an embodiment, at 231, the predictive rescan manager provides the transaction record to a trained machine-learning model 114 as input and receives as output from the model 114 the rescan score.

At 240, the predictive rescan manager determines whether to subject the self-service checkout transaction to a predicted rescan audit based on the rescan score and based on a second setting provided by the retailer.

In an embodiment of 231 and 240, at 241, the predictive rescan manager compares the rescan score against a first suspicious score defined for a full rescan audit in the second setting and the predictive rescan manager compares the rescan score against a second suspicious score defined for a partial rescan audit in the second setting.

In an embodiment of 241 and at 242, the predictive rescan manager, based on 241 sets a rescan audit message (discussed at 250 below) to the full rescan audit or the partial rescan audit.

At 250, the predictive rescan manager determines whether to send the rescan audit message to a transaction manager 133 associated with the store of the retailer where the self-service checkout transaction is being processed based on 220 for the first settings and based on 240 for the second settings.

In an embodiment, at 251, the predictive rescan manager determines not to send the rescan audit message based on a current total number of ongoing rescan audits at the store being equal to a maximum number of concurrent rescans set for the store in the first setting or the second setting.

In an embodiment, at 252, the predictive rescan manager provide with the rescan audit message a maximum number of minutes for conducting a rescan audit of the self-service checkout transaction based on a third setting for the store. The transaction manager 133 enforces this maximum number of minutes during the rescan within the store.

In an embodiment, at 260, the predictive rescan manager receives a third setting for subsequent self-service checkout transaction at the store. The predictive rescan manager suspends sending at 250 of any rescan audit messages when the third setting is associated with a silent mode of operation for the predictive rescan manager (method 200).

In an embodiment of 260 and at 270, the predictive rescan manager receives a fourth setting and the predictive rescan manager reactivates the sending at 250 of rescan audit messages when the fourth setting is associated with a non-silent mode of operation for the predictive rescan manager.

In an embodiment, at 280, the predictive rescan manager obtains historical transaction records for historical self-service checkout transactions along with indications as to whether each of the historical transactions were subject to rescan audits and results associated with the rescan audits. The predictive rescan manager retrains a machine-learning model 114 associated with 230 with the historical transaction records and the indications.

In an embodiment of 280 and at 281, the predictive rescan manager iterates back to 280 at a predefined interval of time or in accordance with a retraining schedule based on a third setting associated with the store.

FIG. 3 is a diagram of another method 300 for operating a predictive rescan service for purposes of determining when to audit a consumer during a self-checkout with a retail store, according to an example embodiment. The software module(s) that implements the method 300 is referred to as a "cloud-based machine-learning transaction audit service." The cloud-based machine-learning transaction audit service is implemented as executable instructions programmed and residing within memory and/or a non-transitory computer-readable (processor-readable) storage medium and executed by one or more processors of a device. The processors that execute the cloud-based machine-learning transaction audit service are specifically configured and programmed for processing the cloud-based machine-learning transaction audit service. The cloud-based machine-learning transaction audit service may have access to one or more network connections during its processing. The network connections can be wired, wireless, or a combination of wired and wireless.

In an embodiment, the device that executes the cloud-based machine-learning transaction audit service is cloud 110. In an embodiment, the device that executes the cloud-based machine-learning transaction audit service is server 110.

In an embodiment, the cloud-based machine-learning transaction audit service is all of or some combination of 135, 113, 114, and/or method 200 of FIG. 2.

The cloud-based machine-learning transaction audit service presents another and, in some ways, enhanced processing perspective of the what was discussed above for cloud 110 and method 200.

At 310, the cloud-based machine-learning transaction audit service provides or renders a rescan interface 135 to or on a retailer server 130.

At 320, the cloud-based machine-learning transaction audit receives rescan settings through the rescan interface 135 from a retailer associated with a store.

At 330, the cloud-based machine-learning transaction audit trains a machine-learning model 114 to provide rescan scores as predicted values that any given self-service checkout transaction at the store should be subject to or should not be subject to a rescan audit at the store.

In an embodiment, at 331, the cloud-based machine-learning transaction audit delays initiation of 331 based on a silent-mode setting being enabled in the rescan settings. During a silent mode of operation, the cloud-based machine-learning transaction audit collects transaction records along with indications as to whether each corresponding self-service checkout transaction was or was not identified as fraudulent if it was subject to the rescan audit.

In an embodiment of 331 and at 332, the cloud-based machine-learning transaction audit initiates 330 when the silent-mode setting is disabled in the rescan settings (non-silent mode of operation enabled for the cloud-based machine-learning transaction audit) and the cloud-based machine-learning transaction audit provides the transaction records along with the indications as input to train the machine-learning model 114.

At 340, the cloud-based machine-learning transaction audit receives real-time transaction records for self-service checkout transaction from the store (through terminal 120 rescan agents 123 or through a transaction manager 133 of server 130).

At 350, the cloud-based machine-learning transaction audit provides the real-time transaction records to the machine-learning model 114 as input and receives the corresponding rescan scores as output from the machine-learning model 114.

At 360, the cloud-based machine-learning transaction audit determines rescan decisions for the self-service checkout transactions based on enforcement of the rescan settings and based on evaluation of the rescan scores provided by model 114.

In an embodiment, at 361, the cloud-based machine-learning transaction audit makes a first initial decision to recommend the rescan audit for a given self-service checkout transaction and the cloud-based machine-learning transaction audit overrides the first decision to not recommend the rescan audit based on a trusted identifier defined in the rescan settings that matches a customer identifier for a customer who is performing the given self-service checkout transaction at the store.

In an embodiment, at 362, the cloud-based machine-learning transaction audit makes a first decision to recommend the rescan audit for a given self-service checkout transaction and overrides the first decision to not recommend the rescan audit based on a maximum number of concurrent and ongoing (in progress) rescan audits being defined in the rescan settings and that maximum number is reached at the store when the first decision was determined by the cloud-based machine-learning transaction audit.

At 370, the cloud-based machine-learning transaction audit provides select ones of the rescan decisions to the store to enforce the rescan audit against the corresponding self-service checkout transactions at the store.

In an embodiment, at 380, the cloud-based machine-learning transaction audit renders a dashboard widget/object/data structure through the rescan interface that graphically depicts information mined from the transaction records, the rescan settings, and the rescan decisions based on retailer-defined criteria. The cloud-based machine-learning transaction audit also provides custom reports through the rescan interface when requested by the retailer through the rescan interface based on the transaction records, the rescan settings, and the rescan decisions.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:

providing a rescan interface to a retailer server;

receiving one or more rescan settings through the rescan interface from a retailer associated with a store;

training a machine-learning model to provide rescan scores as predicted values that any given self-service checkout transaction at the store should be subject to or not subject to a rescan audit;

receiving real-time transaction records for self-service checkout transactions from the store;

providing the real-time transaction records to the machine-learning model and receiving corresponding rescan scores as output from the machine-learning model;

comparing the corresponding rescan scores against one or more suspicious scores defined in the one or more rescan settings to determine, for each self-service checkout transaction, whether the self-service checkout transaction should be subject to a full rescan audit or a partial rescan audit;

determining rescan decisions for the self-service checkout transactions based on enforcement of the one or more rescan settings and evaluation of the rescan scores; and providing select ones of the rescan decisions to the store to enforce the rescan audit against the corresponding self-service checkout transactions at the store.

2. The method of claim 1, wherein training further includes delaying initiation of the training based on a silent-mode setting being enabled in the one or more rescan settings, and wherein during a silent-mode of operation with the silent-mode setting enabled, the real-time transaction records are collected along with indications during any rescans as to whether each corresponding self-service checkout transaction was or was not identified as fraudulent.

3. The method of claim 2, wherein delaying further includes initiating the training when the silent-mode setting is disabled in the one or more rescan settings and providing the real-time transaction records and the indications as input to the machine-learning model.

4. The method of claim 1, wherein determining further includes making a first decision to recommend the rescan audit for a particular self-service checkout transaction and overriding that first decision to not recommend the rescan audit based on a trusted identifier defined in the one or more rescan settings that matches a customer identifier for a customer who is performing the particular self-service checkout transaction at the store.

5. The method of claim 1, wherein determining further includes making a first decision to recommend the rescan audit for a particular self-service checkout transaction and overriding that first decision to not recommend the rescan audit based on a maximum number of concurrent and ongoing rescan audits being defined in the one or more rescan settings and being reached at the store when the first decision was determined.

6. The method of claim 1 further comprising:

rendering a dashboard through the rescan interface that graphically depicts information selectively mined from the real-time transaction records, the one or more rescan settings, and the rescan decisions based on retailer-defined criteria; and providing custom reports through the rescan interface when requested by the retailer through the rescan interface based on the real-time transaction records, the one or more rescan settings, and the rescan decisions.

7. A system, comprising:

a cloud processing environment comprising at least one server;

the at least one server comprising a processor and a non-transitory computer-readable storage medium;

the non-transitory computer-readable storage medium comprises executable instructions; and the executable instructions when executed on the processor from the non-transitory computer-readable storage medium cause the processor to perform operations comprising:

providing a rescan interface to a retailer server;

receiving one or more rescan settings through the rescan interface from a retailer associated with a store;

training a machine-learning model to provide rescan scores as predicted values that any particular self-service checkout transaction at the store should be subject to or not subject to a rescan audit at the store;

receiving real-time transaction records for self-service checkout transactions from the store;

providing the real-time transaction records to the machine-learning model as input and receiving corresponding rescan scores as output from the machine-learning model;

determining rescan decisions for the self-service checkout transactions based on enforcement of the one or more rescan settings and evaluation of the rescan scores;

comparing the rescan scores against one or more suspicious scores defined in the one or more rescan settings to determine whether each self-service checkout transaction should be subject to a full rescan audit or a partial rescan audit; and providing select ones of the rescan decisions to the store to dynamically enforce the rescan audit against corresponding self-service checkout transactions at the store.

8. The system of claim 7, wherein the executable instructions when executed on the processor from the non-transitory computer-readable storage medium further cause the processor to perform additional operations comprising:

providing custom reports requested by the retailer through the rescan interface; and rendering a real-time dashboard within the rescan interface that graphically depicts information selectively mined from the real-time transaction records, the one or more rescan settings, and the rescan decisions based on retailer-defined criteria.

9. A method, comprising:

providing a rescan interface;

receiving one or more rescan settings through the rescan interface from a retailer associated with a store;

training a machine-learning model to provide rescan scores for at least on self-service checkout transaction at the store;

receiving a transaction record for a particular self-service checkout transaction from the store;

providing the transaction record to the machine-learning model and receiving a corresponding rescan score as output;

comparing the corresponding rescan score against a first suspicious score defined in the one or more rescan settings for a full rescan audit and against a second suspicious score defined in the one or more rescan settings for a partial rescan audit;

setting a rescan audit message to indicate either the full rescan audit or the partial rescan audit based on the comparing;

determining a rescan decision for the particular self-service checkout transaction based on the one or more rescan settings and the corresponding rescan score; and sending a rescan audit message to the store for the particular self-service checkout transaction based on the rescan decision.

10. The method of claim 9, wherein training the machine-learning model further comprises:

obtaining historical transaction records along with indications of whether transactions were subject to rescan audits and results of rescan audits; and configuring the machine-learning model using the historical transaction records and the indications.

11. The method of claim 9, wherein determining the rescan decision further comprises:

comparing the corresponding rescan score against one or more suspicious scores defined in the one or more rescan settings for a full rescan audit or a partial rescan audit.

12. The method of claim 9, wherein determining the rescan decision further comprises:

selecting the particular self-service checkout transaction for a random rescan audit based on one or more percentage settings defined in the one or more rescan settings.

13. The method of claim 9, wherein determining the rescan decision further comprises:

enforcing a maximum number of concurrent rescan audits allowed at the store based on the one or more rescan settings.

14. The method of claim 9, wherein determining the rescan decision further comprises:

enforcing maximum time limits for conducting rescan audits based on the one or more rescan settings.

15. The method of claim 9, wherein determining the rescan decision further comprises:

overriding rescan decisions for customers identified as trusted customers in the one or more rescan settings.

16. The method of claim 9 further comprising:

retraining the machine-learning model at predefined intervals using updated transaction records and audit results.

17. The method of claim 9 further comprising:

rendering a dashboard through the rescan interface displaying information from the transaction record, the one or more rescan settings, and the rescan decision.

18. The method of claim 9 further comprising:

operating in a silent mode where rescan audit messages are suspended while transaction records are collected for training.

19. The method of claim 9, wherein the machine-learning model comprises:

a regression-based algorithm or neural network-based algorithm configured to identify fraudulent transactions.

20. The method of claim 9, wherein providing the rescan interface further comprises:

providing a custom report through the rescan interface based on retailer-defined criteria applied to the transaction record, the one or more rescan settings, and the rescan decision.

* * * * *